US00RE35085E

United States Patent [19]

Sanderson

[11] E Patent Number: Re. 35,085

[45] Reissued Date of Patent: Nov. 14, 1995

[54] SPACE FRAME SYSTEM

[76] Inventor: Robert Sanderson, 416 Front St., Marion, Mass. 02738

[21] Appl. No.: 227,300

[22] Filed: Apr. 13, 1994

Related U.S. Patent Documents

Reissue of:

[64] Patent No.: 5,097,645
Issued: Mar. 24, 1992
Appl. No.: 381,374
Filed: Jul. 17, 1989

U.S. Applications:

[63] Continuation of Ser. No. 972,584, Nov. 6, 1992.

[51] Int. Cl.[6] ..... E04B 1/19; A63H 33/08

[52] U.S. Cl. ..... 52/655.1; 52/280; 52/653.2; 52/DIG. 10; 403/171; 403/176; 446/126

[58] Field of Search ..... 52/81.3, 280, 646, 52/648.1, 652.1, 653.2, 655.1, 656.9, DIG. 10; 403/171, 176, 297; 446/124, 126

[56] References Cited

U.S. PATENT DOCUMENTS

| | | | |
|---|---|---|---|
| D. 264,694 | 6/1982 | Takahashi . | |
| D. 281,794 | 12/1985 | Short . | |
| 1,092,217 | 4/1914 | Hopkins . | |
| 1,347,808 | 7/1920 | Franklin . | |
| 2,406,759 | 9/1946 | Glukes . | |
| 2,868,568 | 1/1959 | Frye . | |
| 2,986,241 | 5/1961 | Fuller . | |
| 3,148,539 | 9/1964 | Cook . | |
| 3,284,926 | 11/1966 | Godfrey . | |
| 3,477,188 | 11/1969 | Kostick . | |
| 3,563,580 | 2/1971 | Black . | |
| 3,577,660 | 5/1971 | Kenney . | |
| 3,698,123 | 10/1972 | Heldt . | |
| 3,830,011 | 8/1974 | Ochrymowich . | |
| 3,855,748 | 12/1974 | Thomas . | |
| 4,065,220 | 12/1977 | Ruga . | |
| 4,078,328 | 3/1978 | Rayment . | |
| 4,551,960 | 11/1985 | Fleishman . | |
| 4,627,210 | 12/1986 | Beaulieu . | |
| 4,657,426 | 4/1987 | Targetti | 403/297 |
| 4,676,043 | 6/1987 | Grimm . | |
| 4,761,929 | 8/1988 | Zeigler . | |
| 4,787,191 | 11/1988 | Shima . | |

FOREIGN PATENT DOCUMENTS

| | | | |
|---|---|---|---|
| 2103504 | 7/1972 | Germany | 403/297 |

*Primary Examiner*—Michael Safavi
*Attorney, Agent, or Firm*—Weingarten, Schurgin, Gagnebin & Hayes

[57] ABSTRACT

The construction system of the present invention comprises a plurality of connectors and a plurality or struts, each of the connectors including three discrete flat elements interconnected in three mutually perpendicular planes, each of the three flat elements being composed of a semi-rigid material, each of the three flat elements having a plurality of outwardly directed prongs, and each of the struts being tubes into which the prongs project. The three flat elements are connected by engaging notches and slots. The prongs and the struts are connected by engaging catches and apertures. At least two of the elements have central openings presenting internal profiles and outer peripheries presenting external profiles.

16 Claims, 4 Drawing Sheets

SPACE FRAME SYSTEM

Matter enclosed in heavy brackets [ ] appears in the original patent but forms no part of this reissue specification; matter printed in italics indicates the additions made by reissue.

*This application is a continuation of application Ser. No. 07/972,584, filed Nov. 6, 1992.*

BACKGROUND OF THE INVENTION

1. Field of the Invention

The present invention relates to space frame systems utilizing nodal connectors and interposed struts for creating structural configurations, and more particularly to such space frame systems that typically are used as construction toys, creative sculptures and educational aids.

2. Brief Description of the Prior Art

The prior art discloses a variety of structural systems having connectors and struts for assembling different space frame configurations. These prior art configurations suffer from such problems as confusion due to connectors and struts of different sizes and shapes, lack of versatility in relationships among the struts and connectors, unduly heavy and bulky components causing difficulties in shipment and storage, and lack of dimensional stability when assembled.

SUMMARY OF THE INVENTION

The primary object of the present invention is to provide a novel system of nodal connectors and interposable struts, which provide versatile relationships among the connectors and struts, which are composed of compact and light materials, which occupy restricted space during shipment and storage, but nevertheless can be assembled readily into dimensionally stable configurations of very large size.

Each of the nodal connectors is an assemblage of three flat, semi-rigid elements all of which have exterior peripheries of particular design and at least two of which have interior passages of particular design. The exterior peripheries and interior passages provide internal and external interacting profiles including notches and slots by which the three elements may be snapped together into three orthogonal planes. Each of these elements provides prongs by which the nodal connectors may be joined by struts. When n connector is assembled, the prongs project outwardly from a common geometrical center. The struts, in one form, are elongated tubular straws, which have oppositely positioned punctures or apertures along diameters that are near the ends of the struts. The ends of these struts receive the prongs in such a way that oppositely directed catches on the prongs project into the apertures, whereby the struts and the connectors become joined. In one embodiment of the invention, there are 12 prongs and the basic space frame structure is tetrahedral or octahedral. In another embodiment, there are 18 prongs and the basic space frame structure is parallelepiped, although tetrahedral and octahedral configurations are not precluded.

Other objects of the present invention will in part be obvious and will in part appear hereinafter;

BRIEF DESCRIPTION OF THE DRAWINGS

For a fuller understanding of the nature and objects of the present invention, reference is made to the following description, which is to be taken in connection with the accompanying drawings wherein.

DETAILED DESCRIPTION OF THE PREFERRED EMBODIMENT

The Embodiment of FIGS. 1 to 6

Figure 1A:
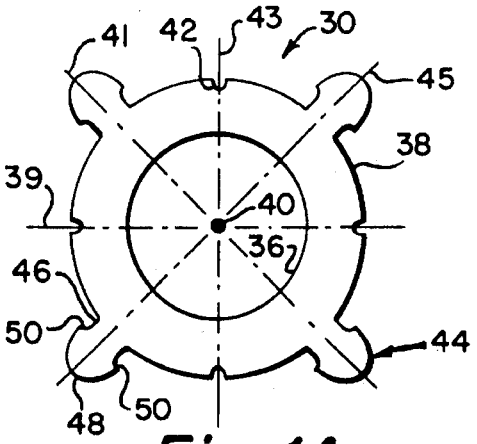
FIG. 1a is a plan view of an inner flat element of the present invention.
Figure 1B:
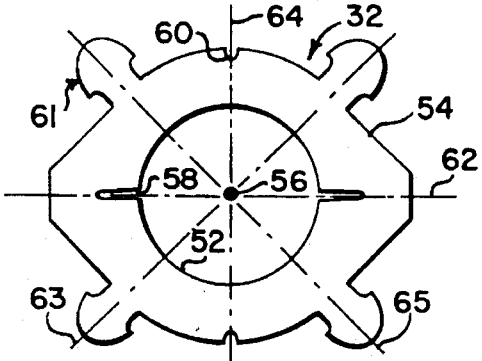
FIG. 1b is a plan view of a medial flat element of the present invention.
Figure 1C:
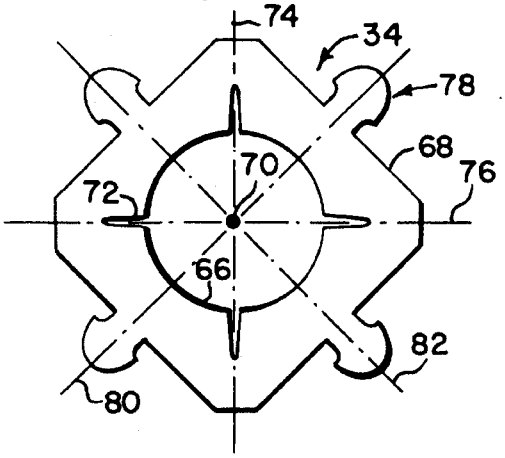
FIG. 1c is a plan view of an outer flat element of the present invention.

FIGS. 1a, 1b and 1c are plan views of an inner element 30, a medial element 32 and an outer element 34, in accordance with the present invention. In one embodiment, each of these elements is stamped from a sheet of a semi-rigid sheet material that quickly resumes its original flatness after being slightly deformed. Preferred sheet materials are composed of plastic or cardboard. In another embodiment, each of these elements is stamped from a sheet of thin aluminum that quickly resumes its original flatness after being slightly deformed. The polymeric composition and thickness of the polymeric elements is such that they may be manually deformed or flexed slightly without cracking to permit them to be assembled in a manner to be described below. The thickness of the aluminum is such that the slight deformation necessary during assembly does not exceed the elastic limit of the aluminum sheet.

As shown, inner element 30 has an annulate body with: a circular opening that provides an internal profile 36, and an external periphery that provides an external profile 38. Internal profile 36, which is uninterrupted, is developed about a geometrical center 40. In an alternative embodiment inner element 30 has no opening. External profile 38 has four shallow notches, one being shown at 42, which are positioned along orthogonal diameters 39, 43 that intersect at geometrical center 40. External profile 38 has four outwardly projecting prongs 44, which are positioned along orthogonal diameters 41, 45 that intersect at geometrical center 40. Any diameter that lies along a notch 42 is angularly spaced by 45 degrees from an adjacent diameter that lies along a prong 44. It will be noted that each prong 44 has an inner stem 46 and an outer cap 48. In the illustrated embodiment, the edges of stem 46 continue as slits through periphery 38 into the annulate body of element 30 to facilitate slight movement of prong 44 into and out of the plane of element 30. In an alternative embodiment, these slits are omitted. Because stem 46 is narrower than cap 48, two oppositely directed catches 50 are provided at the junctions of stem 46 and cap 48.

As shown in FIG. 1b, medial element 32 has an annulate body with a generally circular opening that provides an internal profile 52, and an external periphery that provides an external profile 54. Internal profile 52, which is developed about a geometrical center 56, is interrupted by two relatively deep slots, one being shown at 58, which are oppositely directed along a diameter 62 through geometrical center 56. External profile 54 has two shallow notches, one being shown at 60, along a diameter 64 through geometrical center 56. Diameters 62 and 64 are at right angles with respect to each other. External profile 54 has four prongs, one being shown at 61, each of which is shaped like a counterpart prong 44 in FIG. 1a. Pairs of prongs 61 are oppositely directed along diameters 63 and 65, which intersect at geometrical center 56 and are at right angles with respect to each other. The angular spacing between diameters 63 and 64 is 45 degrees. The angular spacing between diameters 62 and 65 is 45 degrees.

As shown in FIG. 1c, outer element 34 has an annulate body with a generally circular opening that provides an internal profile 66, and an external periphery that provides an external profile 68. Internal profile 66, which is developed about a geometrical center 70, is interrupted by four relatively deep slots, one being shown at 72. Diametrically opposed pairs of slots 72 are directed along two mutually perpendicular axes 74, 76, which intersect at geometrical center 70. External profile 68 has four prongs, one being shown at 78, each of which is similar to a counterpart prong 44 in FIG. 1a. Diametrically opposed pairs of prongs are oppositely directed along diameters 80 and 82, which intersect at geometrical center 70 and are at right angles with respect to each other. The angular spacing between diameters 76 and 82 is 45 degrees.

It is to be noted that the radial distances from geometric center 40 to the four notches 42 of element 30 are equal; the radial distances from geometrical center 56 to the two notches 60 of element 32 are equal; and the radial distance from geometrical center 40 to any notch 42 is equal to the radial distance from geometrical center 56 to any notch 60. Also, the radial distances from the geometrical center to the outer extremities of the two slots 58 are equal; and the radial distances from the geometrical center to the outer extremities of the four slots 72 are equal. Also, radial distances from geometrical center 40 to the outer extremity of each prong 44, the radial distances from geometrical center 56 to the outer extremity of each prong 61, and the radial distances from geometrical center 70 to the outer extremity of each prong 78 all are equal to each other. The inner ends of all notches are the same distance from the center as the outer ends of all slots, so that the pieces spring back to an undeflected state when assembled.

Figure 2:
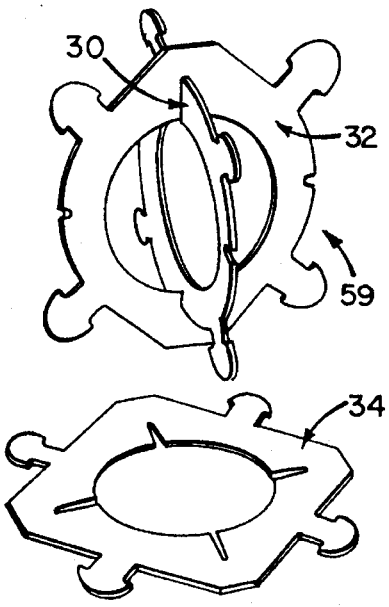
FIG. 2 is a perspective view showing a partial assembly of the inner and medial elements, ready for assembly with the outer element.

Aside from their prongs and notches, the different external profiles of elements 30, 32 and 34 are recognizably different, external profile 38 being generally circular, external profile 54 being generally oblate, and external profile 68 being generally square. FIG. 2 illustrates the sequence by which the three elements 30, 32 and 34 are assembled. First, circular element 30 and oblate element 32 are oriented in perpendicular planes. Next, circular element 30 is manually deformed sufficiently to permit it to be inserted through the opening in oblate element 32 in such a way that two diametrically opposed notches 42 of circular element 30 snap into the two diametrically opposed slots 58 of oblate element 32 to form an intermediate assemblage 59. Then, square element 34 is oriented in a plane that is perpendicular to the planes of both circular element 30 and oblate element 32. Finally, the intermediate assemblage is manually deformed sufficiently for insertion into the central opening of square element 34 in such a way that the exposed diametrically opposed notches of circular element 30 and oblate element 32 snap into the four slots 72 of square element 34.

Figure 3:
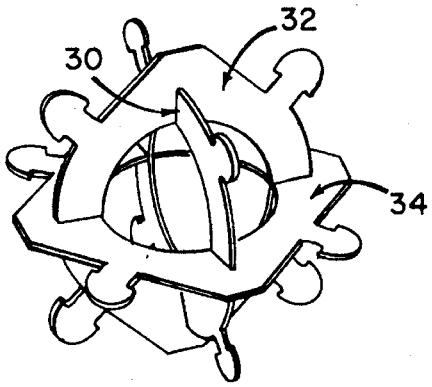
FIG. 3 is a perspective view showing a complete assembly of the inner, medial and outer elements forming one preferred embodiment of a three dimensional connector.

The completed assemblage is shown in FIG. 3 as a dimensionally stable three-dimensional structure having 12 prongs, of which any three present outer caps that can rest on a plane to establish a fixed orientation for the structure. Each of these prongs is adapted for seating within the end of a strut of the type shown in FIG. 4 at 84. In the illustrated embodiment, strut 84 is in the form of a thin-walled elongated narrow tube composed of a semi-rigid polymer. Adjacent to each end of the polymeric strut are pairs of diametrically opposed punctures or apertures 86. When the cap of one of the prongs is inserted into an end of strut 84, the circular cross-section at the end of the strut is deformed to accommodate the cross-sectional width of the cap, which is slightly greater than the normal internal diameter of the strut. Further insertion of the cap into the end of the strut causes opposed catches 50 to snap into the opposed punctures 86. In an alterative embodiment, for use in connection with aluminum flat elements, struts composed of solid wood with slotted ends are used.

Figure 6:
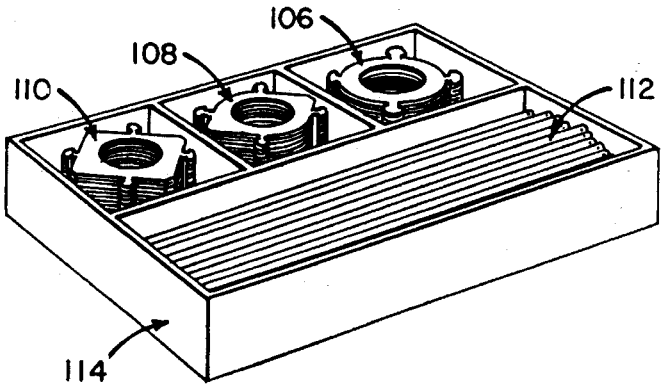
FIG. 6 is a perspective view of a compact kit containing components that embody the present invention.
Figure 4:
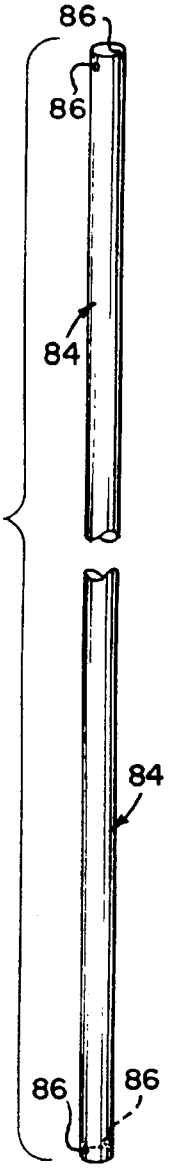
FIG. 4 is a perspective view of a strut in accordance with the present invention.
Figure 5:
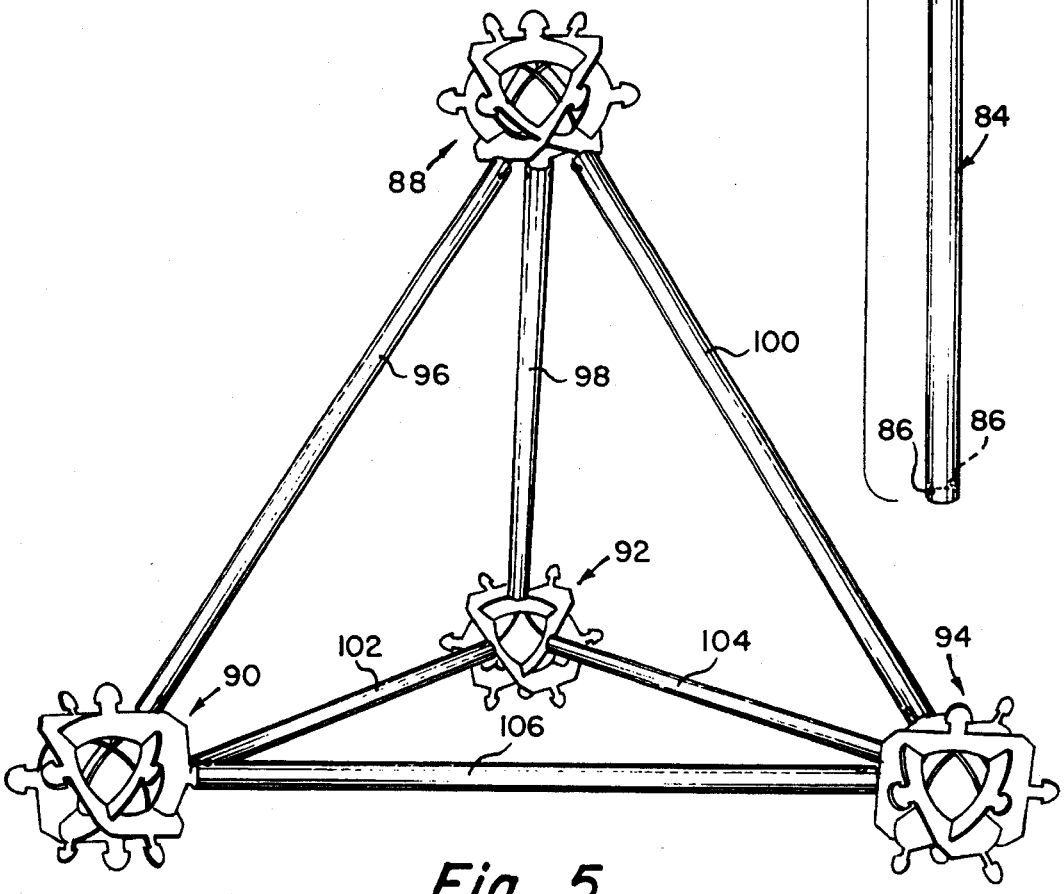
FIG. 5 is a perspective view of a minimal three dimensional structure in the form of a pyramidal configuration in accordance with the present invention.

FIG. 5 illustrates a simple tetrahedral structure which has been assembled from four connectors 88, 90, 92 and 94 and six struts 96, 98, 100, 102, 104 and 106, embodying the present invention. It will be observed that each of the three innermost prongs of each connector is joined by a strut to one of the three innermost prongs of another connector. The arrangement also is such that the three lowermost prongs of each of the three lower connectors contact the flat surface on which it rests. FIG. 6 shows a stack 106 of circular elements 30, a stack 108 of oblate elements 32, a stack 110 of square elements 34, and a supply 112 of parallel struts 84, confined within compartments of a box 114 for storage and shipment as a light, compact product.

The Embodiment of FIGS. 7a to 11

Figure 7A:
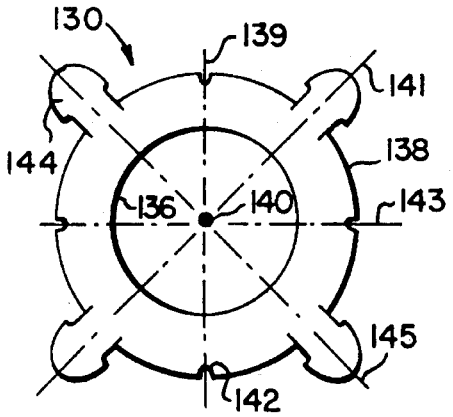
FIG. 7a is a plan view of another inner flat element of the present invention.
Figure 7B:
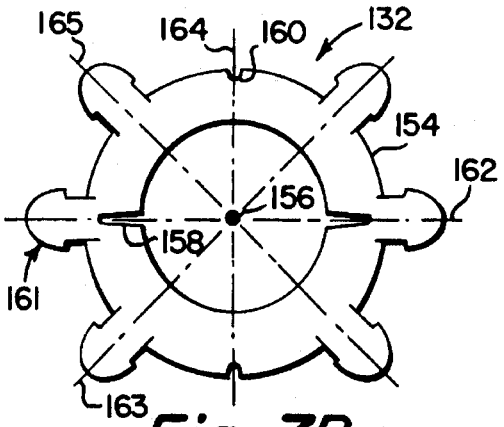
FIG. 7b is a plan view of another medial flat element of the present invention.
Figure 7C:
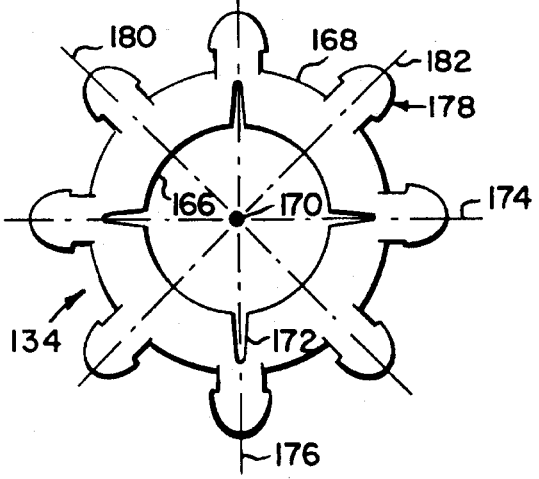
FIG. 7c is a plan view of another outer flat element of the present invention.

FIGS. 7a, 7b and 7c are plan views of an inner element 130, an medial element 132 and an outer element 134, in accordance with the present invention. Each of these elements is stamped from a sheet of a semi-rigid polymer. The polymeric composition and thickness of these elements is such that they may be manually flexed slightly without cracking to permit them to be assembled in a manner to be described below.

As shown, inner element 130 has an annulate body with a circular opening that provides an internal profile 136, and an external periphery that provides an external profile 138. Internal profile 136, which is uninterrupted is developed about a geometrical center 140. External profile 138 has four shallow notches, one being shown at 142, which are positioned along perpendicular diameters 139, 143 that intersect at geometrical center 140. External profile 138 has four outwardly projecting prongs one being shown at 144, which are positioned along perpendicular diameters 141, 145 that intersect at geometrical center 140. Any diameter that lies along a notch 142 is angularly spaced from an adjacent diameter that lies along a prong 144 by 45 degrees. It will be noted that each prong 144 has an inner stem and an outer cap that are identical to their counterparts in FIGS. 1a, 1b, 1c. Because the stem is narrower than the cap, two oppositely directed catches are provided at the junction of the stem and the cap.

As shown, medial element 132 has an annulate body with a generally circular opening that provides an internal profile 152, and an external periphery that provides an external profile 154. Internal profile 152, which is developed about a geometrical center 156, is interrupted by two relatively deep slots, one being indicated at 158, which are oppositely directed along a diameter 162 through geometrical center 156. External profile 154 has two shallow notches, one being shown at 160, along a diameter 164 through geometrical center 156. Diameters 162 and 164 are at right angles with respect to each other. External profile 154 has six prongs, one being shown at 161, each of which is similar to a counterpart prong 44 in FIG. 1(a). Pairs of prongs 161 are oppositely directed along diameters 163, 162 and 165, which intersect at geometrical center 156 and are angularly spaced in sequence from each other and from diameter 164 by 45 degrees.

As shown, outer element 134 has an annulate body with a generally circular opening that provides an internal profile 166, and an external periphery that provides an external profile 168. Internal profile 166, which is developed about a geometrical center 170, is interrupted by four relatively deep slots, one being shown at 172, which are oppositely directed along two mutually perpendicular axes 174, 176 that intersect at geometrical center 170. External profile 168 has eight prongs, one being shown at 178, each of which is similar to a counterpart prong 44 in FIG. 1(a). Pairs of prongs are oppositely directed along diameters 174, 180, 176, and 182, which intersect at geometrical center 170 and are spaced at sequential angular intervals of 45 degrees.

It is to be noted that the radial distances from geometric center 140 to the four notches 142 of inner element 130 are equal, that the radial distances from geometrical center 156 to the two notches 160 of medial element 132 are equal, and that the radial distances from geometrical center 140 to a notch 142 is equal to the radial distance from geometrical center 156 to a notch 160. Also,the radial distances from the geometrical center to the outer extremities of the two slob 158 are equal; and the radial distances from the geometrical center to the outer extremities of the four slots 172 are equal. Also, the radial distances from geometrical center 140 to the outer extremity of each prong 144, the radial distance from geometrical center 156 to the outer extremity of each prong 161, and the radial distance from geometrical center 170 to the outer extremity of each prong 178 all are equal to each other.

Aside from their prongs and notches, the different external profiles of elements 130, 132 and 134 are recognizably different from each other external profile 138 of inner element 130 being four-pronged, external profile 154 of medial element 132 being six-pronged, and external profile 168 of outer element 134 being eight-pronged.

Figure 8:
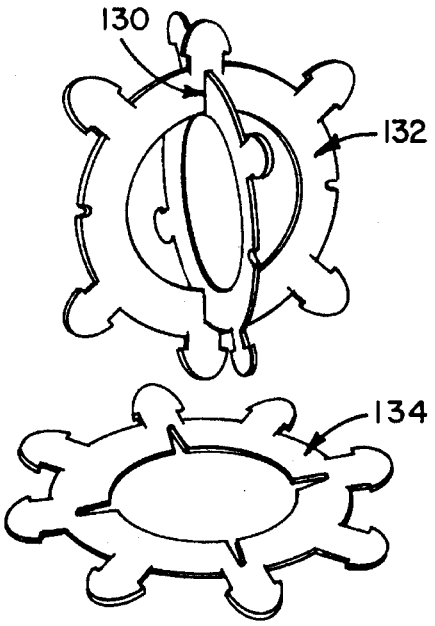
FIG. 8 is a perspective view showing a partial assembly of the inner and medial elements of FIGS. 7a and 7b, ready for assembly with the outer element of FIG. 7c.

FIG. 8 illustrates the sequence by which the three elements are assembled. First, inner element 130 and medial element 132 are oriented in perpendicular planes. Next inner element 130 is manually deformed sufficiently to permit it to be inserted through the opening in medial element 132 in such a way that two diametrically opposed notches 142 of inner element 130 snap into the two diametrically opposed slots 158 of medial element 132 to form an intermediate assemblage. Then outer element 134 is oriented in a plane that is perpendicular to the planes of both inner element 130 and medial element 132. Finally, the intermediate assemblage is manually deformed sufficiently for insertion into the central opening of outer element 134 in such a way that the exposed diametrically opposed notches of inner element 130 and medial element 132 snap into the four slots 172 of outer element 134.

Figure 9:
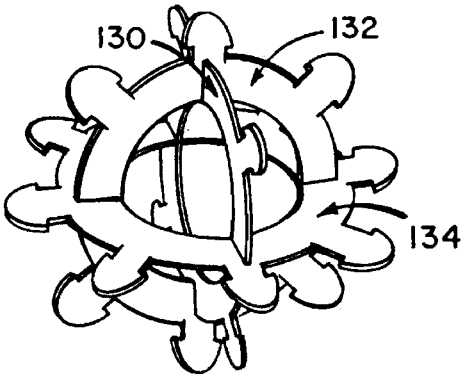
FIG. 9 is a perspective view showing a complete assembly of the inner medial and outer element of FIGS. 7a, 7b and 7c, forming a three dimensional connector.

The complete assemblage is shown in FIG. 9 as a dimensionally stable solid structure having 18 prongs, of which a set of outer caps can rest on a plane to establish a fixed orientation for the structure. Each of these prongs is adapted for seating within the end of a strut of the type shown in FIG. 4 at 84 and described earlier.

Figure 11:
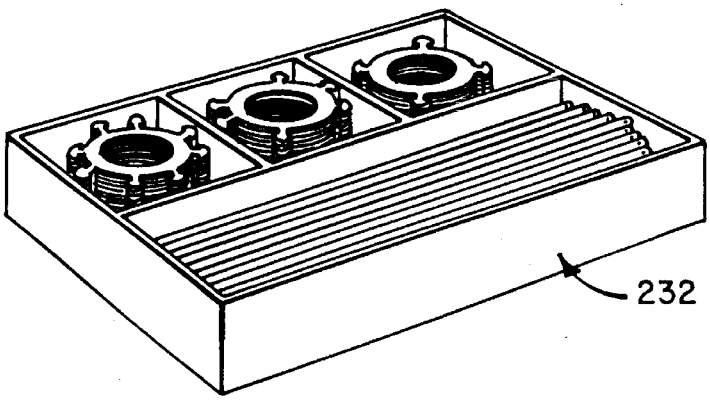
FIG. 11 is a perspective view of another compact kit containing components that embody the present invention.
Figure 10:
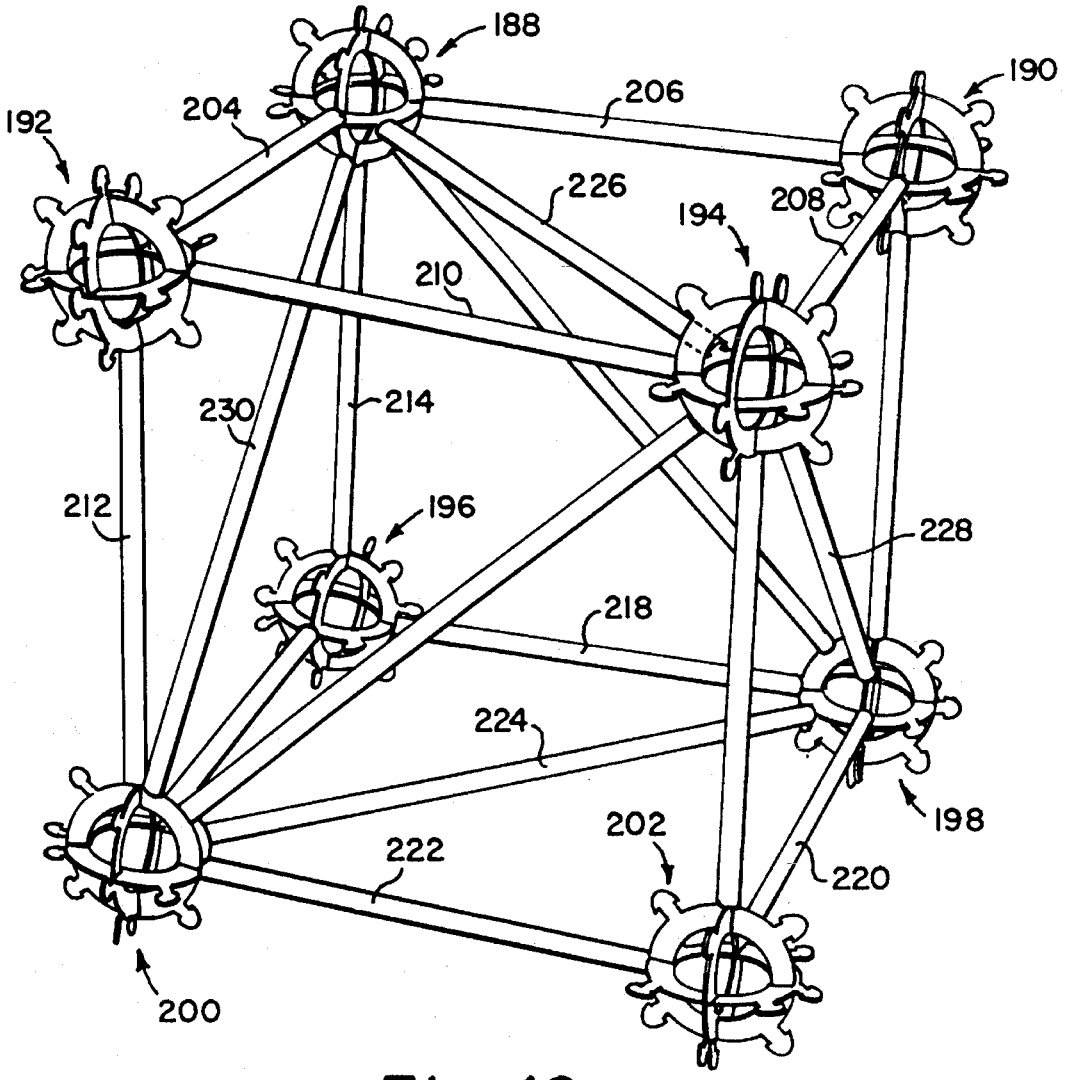
FIG. 10 is a perspective view of a minimal three dimensional structure, utilizing connectors of the type shown in FIG. 9, in the form of a cubical configuration in accordance with the present invention.

FIG. 10 illustrates a simple cubic structure which has been assembled from eight connectors 188, 190, 192, 194, 196, 198, 200, 202 and sixteen struts 204, 206, 208, 210, 212, 214, 216, 218, 220, 222, 224, 226, 228, 230, embodying the present invention. It will be observed that each of a set of innermost prongs of each connector is joined by a strut to one of a set of the innermost prongs of another connector. It will be observed that the struts are of two lengths in accordance with the edges and diagonals of a cube. The arrangement is such that each of the prongs of the lower connectors contact the flat surface on which they rest. FIG. 11 shows stacks of inner, medial and outer elements 130, 132 and 134, together with a supply of struts of two lengths, confined within compartments of a box 232 for storage and shipment as a light, compact product.

OPERATION

The operation of the elements of FIGS. 1a, 1b and 1c is similar to the operation of elements 7a, 7b and 7c. In each case a supply of the elements together with connectors, is shipped and stored in a compact box. A model connector is assembled by slight deformation of the inner member and insertion into the intermediate member, and then by slight deformation of the inner and intermediate members and insertion into the outer member. All three members then are manipulated until their notches and slots map into engagement. When several of such model connectors have been assembled, a space frame can be erected connecting the outwardly projecting prongs of paired nodes together with struts.

In a typical system of the present invention, the distance between the extremities of diametrically opposed prongs is 6.1 centimeters, the width of a cap is 0.7 centimeters, the length of a strut is 20 centimeters, the depth of a notch is 0.1 centimeter, the depth of a slot is 0.7 centimeters the thickness of an element is 0.5 centimeter, and the diametric thickness of a straw is 0.2 centimeter. In one form the elements of FIGS. 1a, 1b, 1c, 7a, 7b and 7c all are stamped from a semi-rigid polymer such as polycarbonate having a thickness ranging from 5 to 25 mils. In another form, the elements of FIGS. 1a. 1b, 1c, 7a, 7b and 7c all are stamped from aluminum sheet having a thickness of approximately 125 mils. The maximum outer diameter of these elements typically ranges from 3 to 5 inches. Strut 84 is composed of a semi-rigid polymer such as polypropylene.

With components of the foregoing dimensions, a three dimensional space frame filling a sizable room can be constructed from a box of inner, medial and outer elements and struts as shown in FIGS. 6 and 11.

What is claimed is:

1. A construction system comprising:

(a) a plurality of connections and a plurality of struts;

(b) each of said connectors including three discrete thin flat elements interconnected in three mutually perpendicular planes;

(c) each of said three thin flat elements being composed of semi-rigid material:

(d) each of said three thin flat elements having a plurality of outwardly directed prongs, with each prong provided with a pair of catches;

(e) each of said struts being tubes, with the ends of said tubes provided with opposed apertures into which said prongs project;

(f) said prongs and said struts being connected by engaging said catches of said prongs within said opposed apertures of said tubes.

2. The construction system of claim 1 wherein said three thin flat elements are connected by engaging notches and slots, and wherein each of at least two of said elements has a central circular opening presently an internal profile and an outer periphery presenting an external profile.

3. The construction system of claim 1 wherein said thin flat elements include an inner circular element, a medial oblate element and a square outer element.

4. The construction system of claim 3 wherein each of said thin flat elements has an open circular center presenting an internal profile and an outer periphery presenting an external profile, said elements being connected by notches in their external profiles and slots in their internal profiles, which notches and slots are engaged.

5. The construction system of claim 4 wherein said inner element has four of said prongs, said medial element has four of said prongs and said outer element has four of said prongs.

6. The construction of claim 1 wherein the diametric distances between the outer extremities of opposed prongs are substantially equal.

7. The construction system of claim 5 wherein the diametric distances between the outer extremities of opposed prongs are substantially equal.

8. The construction of claim 1 wherein said material is a polymer.

9. The construction of claim 1 wherein said material is aluminum.

10. A construction system comprising:

(a) a plurality of connectors and a plurality of struts;

(b) each of said connectors including three discrete thin flat elements adapted for interconnection in three mutually perpendicular planes;

(c) each of said three thin flat elements being composed of a semi-rigid material;

(d) each of said three thin flat elements having a plurality of outwardly directed prongs, and (e) each of said struts being tubes into which said prongs project;

(f) said three thin flat elements being adapted for connection by notches and slots;

(g) said prongs and said struts being adapted for connection by catches of said prongs and opposed openings of said tubes;

(h) each of said elements having a central circular opening presenting an inner profile and an outer periphery presenting an outer profile;

(i) said elements including an internal circular element, a medial oblate element, and a square external element.

11. The construction system of claim 10 wherein said three thin flat elements are connected by engaging notches and slots, and wherein said prongs and said struts are connected by engaging said catches of said prongs within said opposed openings of said tubes.

12. The construction system of claim 10 wherein said internal element has four of said prongs, said medial elements has four of said prongs and said external element has four of said prongs.

13. A construction system comprising:

(a) a plurality of connectors and a plurality of struts;

(b) each of said connectors including three discrete thin flat elements adapted for interconnection in three mutually perpendicular planes;

(c) each of said three thin flat elements being composed of a semi-rigid material;

(d) each of said three thin flat elements having a plurality of outwardly directed prongs;

(e) each of said struts being tubes into which said prongs project;

(f) said three thin flat elements being adapted for connection by notches and slots;

(g) said prongs and said struts being adapted for connection by catches of said prongs and opposed openings formed in the respective ends of said tubes;

(h) each of said elements having central circular openings presenting inner profiles, said elements having circular outer peripheries presenting outer profiles;

(i) said elements including an inner element, a medial element, and an outer element;

(j) said inner and outer profiles being developed about a geometric center, said notches and said slots being positioned along radii extending from said geometric center, said notches being in said outer profiles, said slots being in said inner profiles.

14. The construction system of claim 13 wherein said inner element has four of said prongs, said medial element has six of said prongs, and said outer element has eight of said prongs.

15. The construction of claim 13 wherein the diametric distances between the outer extremities of opposed prongs are substantially equal.

*16. A kit comprising:*

*a connector body;*

*a plurality of outwardly directed prongs coupled to said connector body, each of said outwardly directed prongs including:*

*an inner stem having a first end coupled to said connector body; and*

*an outer cap having a base portion coupled to a second end of said inner stem, wherein the base portion of said outer cap extends beyond said inner stem such that said outer cap forms a pair of catches; and*

*a deformable tube having first and second opposing ends with the first end of said deformable tube having an inner tube diameter, an outer tube diameter and a pair*

*of opposed holes disposed therein, wherein the outer tube diameter of the first end of said deformable tube is less than the distance between the pair of catches of said prongs and the opposed holes in the first end of said deformable tube each have a diameter adapted to accept at least a portion of the catches and wherein the pair of catches of at least one prong are provided having a shape adapted to engage the opposed holes in the first end of said deformable tube and wherein the first end of said tube is sufficiently deformable to permit the pair of catches of said at least one prong to enter the inner diameter of said deformable tube and thereby engage the pair of catches in the opposed holes of the first end of said tube such that at least a portion of each of the pair of catches projects through respective ones of the pair of opposed holes in the first end of said deformable tube.*

* * * * *